(12) United States Patent
Jin et al.

(10) Patent No.: US 10,514,298 B2
(45) Date of Patent: Dec. 24, 2019

(54) TECHNIQUE AND APPARATUS FOR SPECTROPHOTOMETRY USING BROADBAND FILTERS

(71) Applicant: IISM INC., Sejong (KR)

(72) Inventors: Seung Min Jin, Sejong (KR); Il Seung Yang, Sejong (KR); Yun Mi Bae, Sejong (KR); Seong Oak Park, Daejeon (KR); Yu Sic Kim, Daejeon (KR); Du Cheon Choi, Sejong (KR); Mu Hyeop Han, Daejeon (KR)

( * ) Notice: Subject to any disclaimer, the term of this patent is extended or adjusted under 35 U.S.C. 154(b) by 0 days.

(21) Appl. No.: 15/770,656

(22) PCT Filed: Dec. 1, 2016

(86) PCT No.: PCT/KR2016/014032
§ 371 (c)(1),
(2) Date: Apr. 24, 2018

(87) PCT Pub. No.: WO2017/126801
PCT Pub. Date: Jul. 27, 2017

(65) Prior Publication Data
US 2019/0056268 A1     Feb. 21, 2019

(30) Foreign Application Priority Data
Jan. 20, 2016  (KR) .................. 10-2016-0007150

(51) Int. Cl.
*G01J 3/28* (2006.01)
*G01J 3/02* (2006.01)
(Continued)

(52) U.S. Cl.
CPC ........... *G01J 3/2803* (2013.01); *G01J 3/0205* (2013.01); *G01J 3/0208* (2013.01); *G01J 3/0218* (2013.01);
(Continued)

(58) Field of Classification Search
CPC ........... G01N 15/1429; G01N 15/1459; G01N 2015/1486
(Continued)

(56) References Cited

U.S. PATENT DOCUMENTS

| 4,896,965 A | 1/1990 | Goff et al. |
| 5,194,912 A | 3/1993 | Batchelder et al. |

(Continued)

FOREIGN PATENT DOCUMENTS

| JP | 10300915 | 11/1998 |
| JP | 2008216479 | * 9/2008 |
| KR | 1020140127504 | * 11/2014 |

OTHER PUBLICATIONS

EPO; Supplementary European Search Report dated Jun. 3, 2019 in Application No. 16886644.0.
(Continued)

*Primary Examiner* — Sunghee Y Gray
(74) *Attorney, Agent, or Firm* — Snell & Wilmer L.L.P.

(57) ABSTRACT

A spectrophotometer is provided, which comprises a receiving part diffusing an incident light, a first broadband filter group, and a detector detecting the light having passed through the first broadband filter group, in order to easily select and detect a plurality of lights having specific wavelengths, wherein the first broadband filter group comprises a first broadband filter arranged to have a first angle with respect to an incident direction of light to enable the incident light to pass through a first wavelength band, a second broadband filter arranged to have a second angle, which is different from the first angle, with respect to an incident direction of light to enable the light having passed through the first broadband filter to pass through a second wavelength band, and a first path compensation means for adjusting a path of the light having passed through the second broadband filter to be identical to a path of the light having
(Continued)

passed through the first broadband filter, wherein the first broadband filter, the second broadband filter and the first path compensation means are arranged in series with respect to the incident direction of light. Accordingly, it is possible to increase the efficiency of the outputted light compared to the incident light, and to detect a plurality of lights having the desired specific wavelengths at the same time.

8 Claims, 3 Drawing Sheets

(51) Int. Cl.
  *G01J 3/12* (2006.01)
  *G01J 3/26* (2006.01)
  *G02B 5/28* (2006.01)
  *G01J 3/18* (2006.01)
(52) U.S. Cl.
  CPC .............. *G01J 3/0289* (2013.01); *G01J 3/12* (2013.01); *G01J 3/26* (2013.01); *G02B 5/28* (2013.01); *G01J 2003/1204* (2013.01); *G01J 2003/1213* (2013.01); *G01J 2003/1221* (2013.01); *G01J 2003/1243* (2013.01); *G01J 2003/1866* (2013.01)

(58) Field of Classification Search
  USPC .................................................. 356/326–330
  See application file for complete search history.

(56) References Cited

U.S. PATENT DOCUMENTS

| | | | | |
|---|---|---|---|---|
| 5,790,250 | A * | 8/1998 | Wang | ..................... G01J 3/453 356/451 |
| 8,437,582 | B2 | 5/2013 | Kiesel et al. | |
| 2002/0186914 | A1* | 12/2002 | Li | ........................ G02B 6/272 385/11 |
| 2007/0103682 | A1 | 5/2007 | Yoo | |
| 2013/0107270 | A1* | 5/2013 | Stroganov | ................. G01J 3/02 356/451 |
| 2014/0022546 | A1* | 1/2014 | Nagai | ..................... G01J 3/021 356/326 |
| 2014/0022549 | A1 | 1/2014 | Ozeki | |
| 2014/0235973 | A1 | 8/2014 | Brittenham et al. | |
| 2017/0138789 | A1* | 5/2017 | Ivanov | ................. G01J 3/0205 |
| 2017/0276594 | A1* | 9/2017 | Pariseau | ............ G01N 15/1459 |

OTHER PUBLICATIONS

JPO; Office Action dated May 24, 2019 in Application No. 2018522706.

* cited by examiner

[Fig. 1]
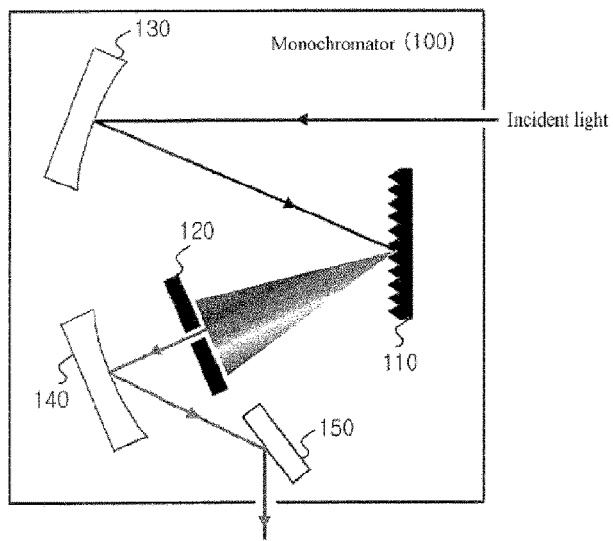
[Fig. 2]
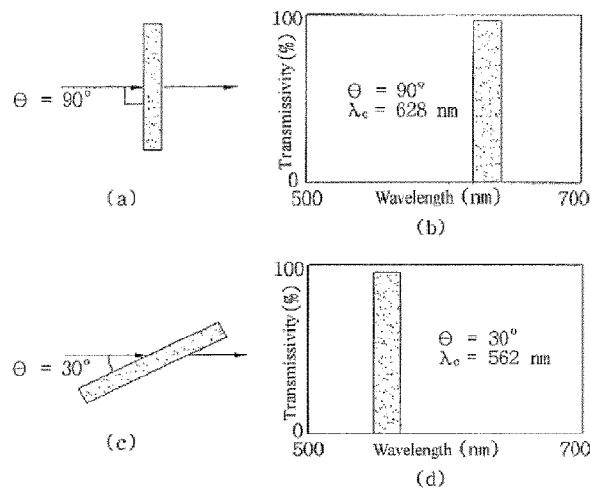
[Fig. 3a]
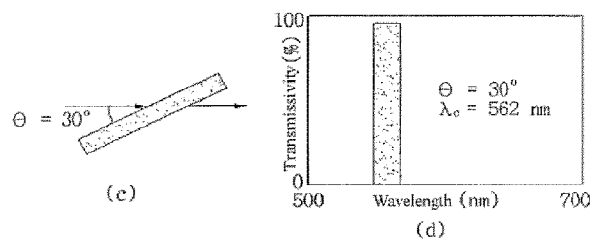
[Fig. 3b]
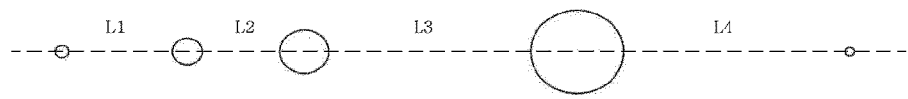

[Fig. 4]
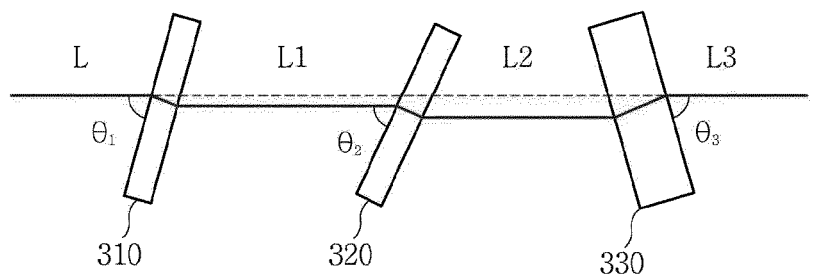
[Fig. 5a]
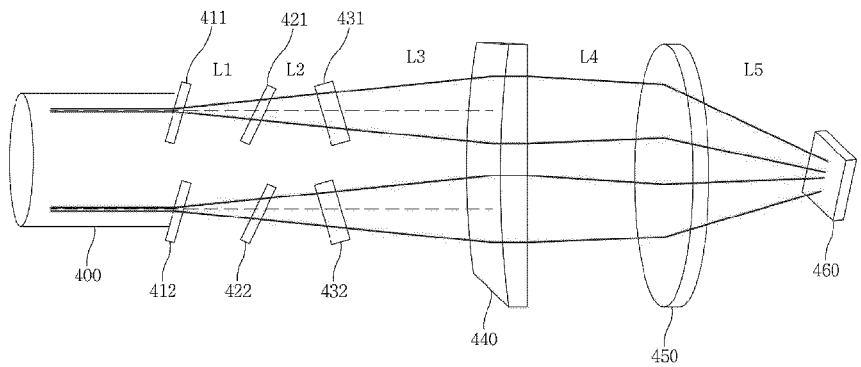
[Fig. 5b]
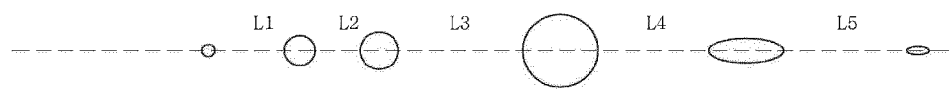
[Fig. 6a]
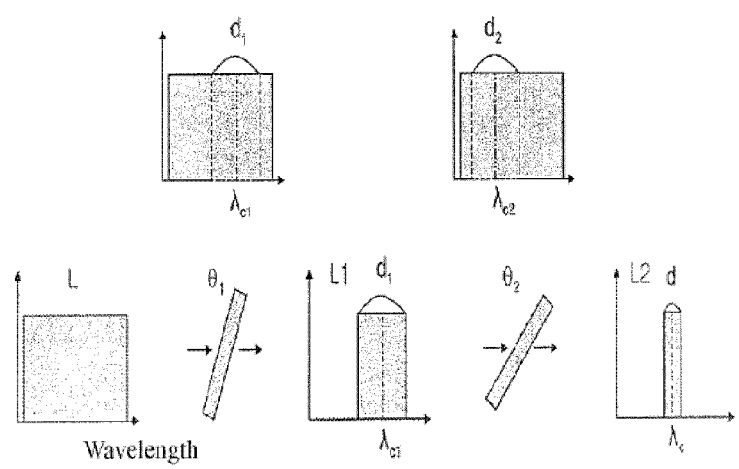

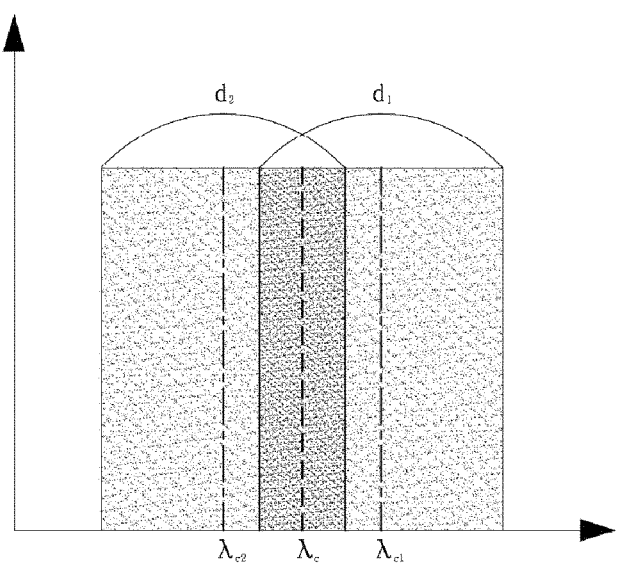
[Fig. 6b]

TECHNIQUE AND APPARATUS FOR SPECTROPHOTOMETRY USING BROADBAND FILTERS

CROSS-REFERENCE TO RELATED APPLICATIONS

This application is the national stage entry of International Application No. PCT/KR16/014032, entitled TECHNIQUE AND APPARATUS FOR SPECTROPHOTOMETRY USING BROADBAND FILTERS, and filed Dec. 1, 2016, which claims the benefit of Korean Patent Application No. 10-2016-0007150, entitled TECHNIQUE AND APPARATUS FOR SPECTROPHOTOMETRY USING BROADBAND FILTERS, and filed Jan. 20, 2016, the disclosures of which, including any appendices, are incorporated herein by reference to the extent such disclosures do not conflict with the present disclosure.

TECHNICAL FIELD

The present invention relates to an apparatus for spectrophotometry which uses the broadband filters. Specifically, it relates to an apparatus which spectralizes light by specially arranging broadband filters that can select wavelengths, thereby deriving a spectrophotometry spectrum.

BACKGROUND ART

As an apparatus for spectralizing light comprising broad wavelength area and extracting monochromatic light, there is a monochromator which uses a diffraction grid or a prism as the dispersing element. The conventional monochromator using a diffraction grid was used for the purpose of providing a light source having a selected wavelength and selectively detecting the light to be detected from the target as a detector. For example, the monochromator for providing a light source is used in a spectrophotometer, for selecting the wavelength of the light source to be the target of analysis from the light source comprising various bands. Korean Patent Laid-Open No. 2008-0015759 discloses a monochromator system having a diffraction grid for separating light in order to have a specific wavelength range and resolving power.

FIG. 1 illustrates a general monochromator (100) using a diffraction grid. The monochromator (100) of FIG. 1 comprises a diffraction grid (110), a slit (120) to let light pass through restrictively, and mirrors (130, 140, 150) with flat or curved surfaces to adjust the route of the light. Specifically, once light with a broad wavelength band is provided to the monochromator, the mirror with a curved surface (130) changes the route of the light and the light is led to the diffraction grid (110). The diffraction grid (110) separates the wavelength of the incident light, and the slit (120) selectively passes through the desired wavelength bands in the separated wavelength bands by adjusting the position or the width, etc. of the slit. The light which passed the slit (120) passes again through the mirrors (140, 150) with flat or curved surfaces, and light having a specific wavelength is outputted from the monochromator.

However, the conventional monochromator using a diffraction grid has a problem that in the process of the incident light being scattered by the diffraction grid or being reflected or permeated by one or more of the mirrors, the efficiency of the light of a specific wavelength outputted from the device for the light incidentally irradiated to the device substantially decreases.

In order to solve this problem, Korean Patent No. 1,524,556 discloses a monochromator which can select the wavelength of the light by using a broadband filter. The patent realizes a monochromator without a diffraction grid by arranging in series one or more broadband filters that have different wavelength ranges of the light to be passed, thereby substantially increasing the efficiency outputted from a monochromator with respect to the incident light, compared to the conventional monochromator using a diffraction grid.

However, the monochromator has problems that a rotating device such as a separate electric motor is needed to change the rotating angles of the broadband filters, and as it comprises only one broadband filter group, it cannot output light of several wavelengths at the same time.

DISCLOSURE OF INVENTION

Technical Problem

The present invention is for solving the problems of the monochromator using a diffraction grid described above and the monochromator changing the rotational angles of the broadband filters. An object of the present invention is to provide a technology which allows realizing a monochromator without a diffraction grid or a rotating device, and by arranging one or more broadband filter groups consisting of broadband filters that have different wavelength ranges of the light to be passed, enables detecting light of a plurality of desired central wavelengths and bandwidths at the same time.

However, the subject matter to be solved of the present invention is not limited to the abovementioned object, and within the scope not exceeding the idea and the field of the invention, various expansions may be made.

Solution to Problem

In order to achieve an object of the present invention, the spectrophotometer for analyzing a light having a specific wavelength band from an incident light according to the embodiments of the present invention comprises a receiving part diffusing an incident light, a first broadband filter group, and a detector detecting the light having passed through the first broadband filter group, wherein the first broadband filter group comprises a first broadband filter arranged to have a first angle with respect to an incident direction of light to enable the incident light to pass through a first wavelength band, a second broadband filter arranged to have a second angle, which is different from the first angle, with respect to an incident direction of light to enable the light having passed through the first broadband filter to pass through a second wavelength band, and a first path compensation means for adjusting a path of the light having passed through the second broadband filter to be identical to a path of the light having passed through the first broadband filter, wherein the first broadband filter, the second broadband filter and the first path compensation means can be arranged in series with respect to the incident direction of light.

According to an embodiment, the spectrophotometer of the present invention further comprises a second broadband filter group, and the second broadband filter group comprises a third broadband filter arranged to have a third angle with respect to an incident direction of light to enable the incident light to pass through a third wavelength band, a fourth broadband filter arranged to have a fourth angle, which is different from the third angle, with respect to an incident direction of light to enable the light having passed through the third broadband filter to pass through a fourth wavelength band, and a second path compensation means for adjusting a path of the light having passed through the third broadband filter to be identical to a path of the light having passed through the fourth broadband filter, wherein the third broadband filter, the fourth broadband filter and the second path compensation means can be arranged in series with respect to the incident direction of light, and the first broadband filter group and the second broadband filter group can be arranged, when viewed from a side, in a straight line in a direction perpendicular to the incident direction of light.

According to an embodiment, the spectrophotometer of the present invention further comprises N broadband filter groups which are arranged, when viewed from a side, in a straight line with the first broadband filter group and the second broadband filter group in a direction perpendicular to the incident direction of light, wherein 1≤N≤28.

According to an embodiment, the receiving part comprises a first receiving part and a second receiving part, and a light can be incidentally irradiated to the first broadband filter group from the first receiving part, and a light can be incidentally irradiated to the second broadband filter group from the second receiving part.

According to an embodiment, the spectrophotometer of the present invention further comprises at least one or more lens between the first broadband filter group and the detector for preventing interference, and the at least one or more lens can comprise at least one of a cylindrical lens, a convex lens, or any combination thereof.

According to an embodiment, the detector can be an image sensor.

Advantageous Effects of Invention

The spectrophotometer for analyzing a light having a specific wavelength band from an incident light according to the embodiments of the present invention can substantially increase the efficiency of the light outputted from the monochromator with respect to the incident light, compared to the spectrophotometer comprising a monochromator using a diffraction grid, and can be flexibly applied to various imaging methods other than a scanning imaging method.

Also, by arranging a plurality of broadband filter groups outputting different wavelengths, when viewed from a side, in a straight line in a direction perpendicular to the incident direction of light, the spectrophotometer according to the embodiments of the present invention can detect a plurality of lights having the desired specific wavelengths at the same time.

Moreover, by comprising a receiving part that diffuses the incident light, the spectrophotometer according to the embodiments of the present invention does not need a separate rotating device for rotating the broadband filter. This has an advantage that the relatively expensive installation cost of an optical system can be saved, and at the same time, miniaturization of the device is possible.

However, the effect of the present invention is not limited to the above, and within the scope not exceeding the idea and the field of the invention, various expansions may be made.

BRIEF DESCRIPTION OF DRAWINGS

FIG. 1 represents the conventional monochromator having a diffraction grid.

FIGS. 2 (a) to (d) represent exemplary results of the permeated wavelength band according to the rotational angle of the broadband filter.

FIG. 3a represents the spectrophotometer according to an embodiment of the present invention.

FIG. 3b represents the changes in the size and the shape of the light source in the spectrophotometer according to FIG. 3a.

FIG. 4 illustrates the fundamentals of the compensation unit included in the spectrophotometer of the present invention.

FIG. 5a represents the spectrophotometer according to an embodiment of the present invention.

FIG. 5b represents the changes in the size and the shape of the light source in the spectrophotometer according to FIG. 5a.

FIG. 6a illustrates the process of the selection of a specific wavelength according to an embodiment of the present invention.

FIG. 6b illustrates the fundamentals of using two broadband filters to select a specific wavelength according to an embodiment of the present invention.

BEST MODE FOR CARRYING OUT THE INVENTION

Regarding the embodiments of the present invention in this text, particular structural and functional explanations are merely examples for the purposes of explaining the embodiments of the present invention, and the embodiments of the present invention can be carried out in various forms and shall not be construed as being limited to the embodiments described in this text.

The present invention can have various modifications and forms, and thus specific embodiments are described in this text in detail with examples in drawings. However, this is not purported to limit the present invention to a specific disclosed form, but it shall be understood to include all modifications, equivalents and substitutes within the idea and the technological scope of the present invention.

The terminology used in the present invention is used for the purposes of explaining the specific embodiment only, and it is not intended to limit the present invention. Singular expressions shall include the plural expressions unless expressly meant otherwise in context. In the present invention, it shall be understood that the terms such as "comprise/include" or "have" etc., are intended to designate the presence of the feature, number, step, movement, component, part or their combination, and not excluding the presence or possibility of addition of one or more of other features or numbers, steps, movements, components, parts or their combinations beforehand.

Unless defined otherwise, including the technical or scientific terms, all terms used here mean the same as generally understood by a skilled person in the art to which the present invention pertains. The terms that are used generally as defined in a dictionary, shall be construed as the meaning consistent with the meaning in the context of the related technology, and unless the present invention expressly defines otherwise, they shall not be construed as having ideal or excessively typical meaning.

In this text, the preferable embodiment of the present invention will be explained in more detail with reference to the attached drawings. For the identical components on the drawings, identical reference numerals shall be used, and any overlapping description of the identical component shall be omitted.

FIGS. 2 (a) to (d) represent exemplary results of the passed wavelength range according to the rotational angle of the broadband filter of FIG. 2. Specifically, FIG. 2(a) illustrates the case in which the light is passed with the angle of the broadband filter with respect to the incident direction of the light arranged in 90°, and the exemplary result of the passed light is illustrated in FIG. 2(b). Referring to FIG. 2(b), where the light is passed with respect to the angle of the broadband filter with respect to the incident direction of the light arranged in 90°, it can be seen that only the light with the central wavelength of 628 nm and a bandwidth of certain width is passed. Moreover, FIG. 2(c) is a case in which the light is passed with the angle of the broadband filter with respect to the incident direction of the light arranged in 30°, and as shown in FIG. 2(d), it can be seen that only the light with the central wavelength of 562 nm and a bandwidth of certain width is passed. As such, the broadband filter used in the present invention can be a bandwidth passing filter having a different central wavelength according to the angle of the broadband filter with respect to the incident direction of the light. Moreover, a bandwidth passing filter having a different central wavelength and bandwidth according to the angle with respect to the incident direction of the light can also be used.

FIG. 3a represents the spectrophotometer according to an embodiment of the present invention. The spectrophotometer according to this embodiment comprises a receiving part (300) that distributes the incident light. The incident light from the light source is diffused as it passes through the receiving part (300), and the diffused light is incidentally irradiated to the first broadband filter group that will be described later. As the receiving part (300) of the spectrophotometer of the present invention, for example, optical fiber, a rod, a concave lens, etc. can be used. In addition to them, a material that can diffuse the incident light can also be used as the receiving part. The light that passed through the receiving part is diffused and is incidentally irradiated to the broadband filter group. Accordingly, the spectrophotometer of the present invention does not need a separate rotating device for changing the rotational angle of the broadband filter, etc.

The spectrophotometer according to this embodiment comprises a first broadband filter group consisting of a first broadband filter (310) that has a first angle ($\theta_1$) with respect to the incident direction of the light, a second broadband filter (320) that has a second angle ($\theta_2$) with respect to the incident direction of the light, and a compensation unit (330). Also, the spectrophotometer according to this embodiment comprises a detector (350) that detects the light that passed through the first broadband filter group. The incident light L passes through the first broadband filter (310) and becomes the light L1 having only a wavelength of a predetermined bandwidth according to the first angle ($\theta_1$). The light L1 passes through the second broadband filter (320) having the second angle ($\theta_2$) with respect to the incident direction of the light, and becomes the light L2 having only the common wavelength band among the bands that passed through the first broadband filter and the second broadband filter as its wavelength.

Meanwhile, FIG. 4 illustrates the fundamentals of the compensation unit included in the spectrophotometer of the present invention. When the light passes through the broadband filters, the route of the light varies depending on the thickness, number, incident angle, etc. of the filter. For example, L1 and L2 that passed through the first broadband filter and the second broadband filter have a difference in route compared to the incident light L as illustrated in FIG. 4. As such, if the route of the light varies every time the thickness, number, angle, etc. of the broadband filter vary, it can be a significant restriction on using various combinations of the broadband filters for selecting various scopes of wavelength. Thus, the spectrophotometer of the present invention comprises the compensation unit (330), and thus adjusts the route of the light so that the change in the route of the light incurred by passing through the first broadband filter and the second broadband filter is identical to that in the route of the light before passing through the broadband filters. Thus, the light L3 which passed through the compensation unit (330) has only the wavelength band that passed through both the first broadband filter and the second broadband filter, and at the same time, has the same light route as the incident light L which did not pass through the broadband filters.

As an embodiment, at least one or more lens can be arranged between the compensation unit (330) and the detector (350) for preventing interference. In the spectrophotometer of FIG. 3a which comprises a broadband filter group, a convex lens (340) can be used. FIG. 3b represents the changes in the size and the shape of the light source in each of its progressing stages. The light (L3) that is irradiated after passing through the compensation unit (330) converges while being refracted as it passes through the convex lens (340). By arranging a detector (350) in the location where the refracted light (L4) converges, light can be detected more easily.

FIG. 5a represents the spectrophotometer according to another embodiment of the present invention. The spectrophotometer according to this embodiment further comprises, in addition to the spectrophotometer of FIG. 3a, a second broadband filter group consisting of a third broadband filter (412) that has a third angle ($\theta_3$) with respect to the incident direction of the light, a fourth broadband filter (422) that has a fourth angle ($\theta_4$) with respect to the incident direction of the light, and a second compensation unit (432). The first and the second broadband filter groups are arranged, when viewed from a side, in a straight line in a direction perpendicular to the incident direction of light.

As an embodiment, at least one or more lens can be arranged between the compensation unit (431, 432) and the detector (460) for preventing interference. In the spectrophotometer of FIG. 5a which comprises two broadband filter groups, a cylindrical lens (440) and a convex lens (450) can be used. FIG. 5b represents the changes in the size and the shape of the light source in each of its progressing stages. Each light (L3) that is irradiated after passing through the compensation unit (431, 432) becomes an oval shape as it passes through the cylindrical lens (440), and converges after passing through the convex lens (450). By arranging a detector (460) in the location where the light (LA) that passed through the convex lens (450) converges, light can be detected more easily.

Also, the spectrophotometer of the present invention can further comprise N ($1 \leq N \leq 28$) broadband filter groups that are arranged, when viewed from a side, in a straight line in a direction perpendicular to the incident direction of light, in addition to the first broadband filter group and the second broadband filter group. By arranging a plurality of broadband filter groups having different angles with respect to the incident direction of light, separated lights in the number of the broadband filter groups which have different wavelengths from one another can be detected at the same time.

As an embodiment, the spectrophotometer of the present invention can comprise a plurality of optical fibers that distribute the light source. For example, the spectrophotometer illustrated in FIG. 5a can comprise a first optical fiber that makes the light incident to the first broadband filter group, and a second optical fiber that makes the light incident to the second broadband filter group. The number of the optical fibers is not limited to this, but the optical fibers can be included by the number of the broadband filter groups to distribute the light source.

In the spectrophotometer of the present invention, different types of detectors can be used. For example, detectors such as an image sensor, a PMT (photomultiplier tube), a CCD (Charge Coupled Device) array detector, a CMOS detector, a photodiode array detector, etc. can be used, and are not limited to them.

FIG. 6a illustrates the process of the selection of a specific wavelength according to an embodiment of the present invention. The light L with a wavelength of broad bandwidth is provided with the monochromator. The first broadband filter works as the first bandwidth passing filter having the central wavelength $\lambda_{c1}$ and the bandwidth $d_1$ when it is arranged to have the angle $\theta_1$ with respect to the incident direction of the light. The light L1 is the result of the Light L passing through the first broadband filter with the angle $\theta_1$, and it has the central wavelength $\lambda_{c1}$ and the bandwidth $d_1$. The second broadband filter works as the second bandwidth passing filter having the central wavelength $\lambda_{c2}$ and the bandwidth $d_2$ when it is arranged to have the angle $\theta_2$ with respect to the incident direction of the light. Only the part of the wavelength of the light L1 corresponding to the second bandwidth passing filter passes and becomes the light L2. In this regard, FIG. 6b illustrates the fundamentals of selecting a specific wavelength by letting the light pass through the broadband filter with the central wavelength $\lambda_{c1}$ and the bandwidth $d_1$, and the broadband filter with the central wavelength $\lambda_{c2}$ and the bandwidth $d_2$. By such fundamentals, the light L2 ultimately has the central wavelength $\lambda_c$ and the bandwidth d, and here, each of $\lambda_c$ and d is derived by the following equation 1 and equation 2.

$$\lambda_c = \tfrac{1}{2}(\lambda_{c1}+\lambda_{c2}) - |d_1 - d_2| \quad \text{[Equation 1]}$$

$$d = \tfrac{1}{2}(d_1+d_2) - \tfrac{1}{4}|\lambda_{c1} - \lambda_{c2}| \quad \text{[Equation 2]}$$

The spectrophotometer of the present invention, by the fundamentals as above, can freely select the desired wavelength by adjusting the angles of the broadband filters with respect to the incident direction of the light and varying the central wavelength and the bandwidth of the wavelength bandwidth being passed. Also, by using a plurality of broadband filter groups, it can detect light of a plurality of wavelengths at the same time.

As above, the present invention is described with reference to a preferred embodiment, but a skilled person in the art would understand that the present invention may be modified and changed variously within the scope not exceeding the idea and the field of the present invention described in the below claims.

The invention claimed is:

1. A spectrophotometer for analyzing a light having a specific wavelength band from an incident light, the spectrophotometer comprising:
    a receiving part diffusing an incident light from one side at the other side, wherein the receiving part is configured of a rod or a concave lens, which can diffuse an incident light;
    a first broadband filter group;
    a second broadband filter group; and
    a detector detecting the light having passed through the first broadband filter group,
    wherein the first broadband filter group comprises a first broadband filter arranged to have a first angle with respect to an incident direction of light to enable the incident light to pass through a first wavelength band;
    a second broadband filter arranged to have a second angle, which is different from the first angle, with respect to an incident direction of light to enable the light having passed through the first broadband filter to pass through a second wavelength band; and
    a first path compensation means for adjusting a path of the light having passed through the second broadband filter to be identical to a path of the light having passed through the first broadband filter,
    wherein the first broadband filter, the second broadband filter and the first path compensation means are arranged in series with respect to the incident direction of light,
    wherein the second broadband filter group comprises a third broadband filter arranged to have a third angle with respect to an incident direction of light to enable the incident light to pass through a third wavelength band;
    a fourth broadband filter arranged to have a fourth angle, which is different from the third angle, with respect to an incident direction of light to enable the light having passed through the third broadband filter to pass through a fourth wavelength band; and
    a second path compensation means for adjusting a path of the light having passed through the third broadband filter to be identical to a path of the light having passed through the fourth broadband filter,
    wherein the third broadband filter, the fourth broadband filter and the second path compensation means are arranged in series with respect to the incident direction of light, and
    wherein the first broadband filter group and the second broadband filter group are arranged, when viewed from a side, in a straight line in a direction perpendicular to the incident direction of light.

2. The spectrophotometer of claim 1, further comprising N broadband filter groups which are arranged, when viewed from a side, in a straight line with the first broadband filter group and the second broadband filter group in a direction perpendicular to the incident direction of light,
    wherein $1 \leq N \leq 28$.

3. The spectrophotometer of claim 2, wherein the detector is an image sensor.

4. The spectrophotometer of claim 1, wherein the receiving part comprises a first receiving part and a second receiving part;
    a light is incident to the first broadband filter group from the first receiving part; and
    a light is incident to the second broadband filter group from the second receiving part.

5. The spectrophotometer of claim 1, further comprising at least one or more lens between the first broadband filter group and the detector for preventing interference, the at least one or more lens comprising at least one of:
    a cylindrical lens;
    a convex lens; or
    any combination thereof.

6. The spectrophotometer of claim 1, wherein the detector is an image sensor.

7. The spectrophotometer of claim 1, further comprising at least one or more lens between the first broadband filter group and the detector for preventing interference, the at least one or more lens comprising at least one of:

a cylindrical lens;
a convex lens; or
any combination thereof.

8. The spectrophotometer of claim 1, wherein the detector is an image sensor.

* * * * *